US010275497B2

(12) United States Patent
Harada

(10) Patent No.: US 10,275,497 B2
(45) Date of Patent: Apr. 30, 2019

(54) ELECTRONIC WHITEBOARD SYSTEM, SEARCH RESULT DISPLAY METHOD OF ELECTRONIC WHITEBOARD, AND NON-TRANSITORY COMPUTER READABLE MEDIUM STORING PROGRAM THEREOF

(71) Applicant: NEC Corporation, Minato-ku, Tokyo (JP)

(72) Inventor: Chihiro Harada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 355 days.

(21) Appl. No.: 15/057,310

(22) Filed: Mar. 1, 2016

(65) Prior Publication Data

US 2016/0266741 A1 Sep. 15, 2016

(30) Foreign Application Priority Data

Mar. 13, 2015 (JP) ................. 2015-050692

(51) Int. Cl.
*G06F 3/048* (2013.01)
*G06F 17/30* (2006.01)

(52) U.S. Cl.
CPC .... *G06F 17/3053* (2013.01); *G06F 17/30554* (2013.01)

(58) Field of Classification Search
CPC ....... G06F 2203/04803; G06F 17/3053; G06F 17/30554; G06F 21/83; G06F 21/84; G06F 2221/2141; G06F 3/04883
See application file for complete search history.

(56) References Cited

U.S. PATENT DOCUMENTS

| 6,826,559 | B1 * | 11/2004 | Ponte | G06F 17/30867 |
| 7,120,627 | B1 * | 10/2006 | Schabes | G06F 17/30646 |
| 7,873,622 | B1 * | 1/2011 | Karls | G06F 17/30864 |
| | | | | 707/707 |
| 8,543,936 | B2 * | 9/2013 | Neale | G06F 17/30637 |
| | | | | 707/706 |
| 2004/0215660 | A1 * | 10/2004 | Ikeda | G06F 17/30277 |

(Continued)

FOREIGN PATENT DOCUMENTS

JP 2004151855 A * 5/2004
JP 2004-199407 A 7/2004
(Continued)

OTHER PUBLICATIONS

Japanese Office Action for JP Application No. 2015-050692 dated Feb. 5, 2019 with English Translation.

*Primary Examiner* — Linh K Pham

(57) ABSTRACT

An electronic whiteboard system includes a search unit configured to search for the electronic whiteboard based on a search condition, an extraction unit configured to extract one or a plurality of the areas that are matched with the search condition or one or a plurality of the areas to which an object that is matched with the search condition belongs as a search result, a creation unit configured to create a search result electronic whiteboard composed of one screen information, and a presenting unit configured to display the created search result electronic whiteboard on a screen. The electronic whiteboard system displays a result in which one or a plurality of electronic whiteboards are searched for based on the search condition on the screen.

10 Claims, 7 Drawing Sheets

(56) References Cited

U.S. PATENT DOCUMENTS

| | | | |
|---|---|---|---|
| 2006/0010197 A1* | 1/2006 | Ovenden | G06Q 10/00 709/204 |
| 2008/0077614 A1* | 3/2008 | Roy | G06F 17/30702 |
| 2009/0228481 A1* | 9/2009 | Neale | G06F 17/30637 |
| 2010/0094706 A1* | 4/2010 | Gabai | G06Q 10/00 705/14.53 |
| 2010/0141661 A1* | 6/2010 | Kojima | G09B 7/00 345/473 |
| 2011/0225179 A1* | 9/2011 | Cheng | G06F 17/3028 707/769 |
| 2012/0050197 A1* | 3/2012 | Kemmochi | G06F 21/6209 345/173 |
| 2012/0075203 A1* | 3/2012 | Lin | G06F 3/0416 345/173 |
| 2014/0013246 A1* | 1/2014 | Beechuk | H04L 65/403 715/753 |
| 2014/0111600 A1* | 4/2014 | Schaefer | H04N 5/232 348/14.08 |
| 2014/0375578 A1* | 12/2014 | Ogino | G06F 17/24 345/173 |
| 2015/0091940 A1* | 4/2015 | Emori | G09G 5/377 345/629 |
| 2015/0278983 A1* | 10/2015 | Uefuji | G09G 5/003 345/173 |
| 2016/0093229 A1* | 3/2016 | Mayumi | G06Q 10/101 434/350 |
| 2016/0127685 A1* | 5/2016 | Huang | H04L 12/1822 348/14.07 |
| 2016/0203793 A1* | 7/2016 | Kim | G09G 5/12 434/408 |
| 2016/0275572 A1* | 9/2016 | Omachi | G06Q 30/0277 |
| 2017/0220537 A1* | 8/2017 | Nelson | G06F 17/241 |
| 2017/0293685 A1* | 10/2017 | Miller | G06F 17/241 |

FOREIGN PATENT DOCUMENTS

| | | |
|---|---|---|
| JP | 2004-302521 A | 10/2004 |
| JP | 2008-102613 A | 5/2008 |
| JP | 2017068399 A * | 4/2017 |

* cited by examiner

ELECTRONIC WHITEBOARD DATA 100

| WHITEBOARD ID 101 | WHITEBOARD NAME 102 | CREATED DATE & TIME 103 | LAST UPDATED DATE & TIME 104 | CREATOR 105 | LAST UPDATED PERSON 106 | ... |
|---|---|---|---|---|---|---|
| 1 | CONFERENCE MINUTES 7/18 | JUL/19/2014 | JUL/19/2014 | YAMADA | YAMADA | |
| 2 | INVESTIGATE ○○ FUNCTION | JUL/21/2014 | AUG/8/2014 | TANAKA | TAYAMA | |
| 3 | INVESTIGATE △△ | JUL/28/2014 | AUG/18/2014 | TAYAMA | TANAKA | |
| 4 | CONFERENCE MINUTES 7/25 | JUL/25/2014 | JUL/25/2014 | NAKATA | NAKATA | |
| ⋮ | | | | | | |

Fig. 3

| AREA ID | SUBJECT WHITEBOARD ID | AREA NAME | X COORDINATE | Y COORDINATE | WIDTH | HEIGHT | ... |
|---|---|---|---|---|---|---|---|
| 1 | 1 | MINUTES | 0 | 0 | 250 | 300 | |
| 2 | 1 | AI | 250 | 0 | 150 | 300 | |
| 3 | 1 | ASSIGNMENT (YAMADA) | 0 | 300 | 100 | 100 | |
| 4 | 1 | ASSIGNMENT (TAYAMA) | 100 | 300 | 100 | 100 | |
| 5 | 1 | ASSIGNMENT (TANAKA) | 200 | 300 | 100 | 100 | |
| 6 | 2 | OVERVIEW OF FUNCTION○○ | 0 | 0 | 500 | 150 | |
| 7 | 2 | NOTE | 0 | 150 | 500 | 200 | |
| 8 | 2 | SUMMARY | 0 | 350 | 500 | 100 | |
| ... | | | | | | | |

Fig. 4

OBJECT DATA 120

| OBJECT ID 121 | SUBJECT AREA ID 122 | OBJECT TYPE 123 | DATA 124 | X COORDINATE 125 | Y COORDINATE 126 | WIDTH 127 | HEIGHT 128 |
|---|---|---|---|---|---|---|---|
| 1 | 1 | 1 | DEVELOPMENT TEAM PROGRESS<br>JUL. 12 | 10 | 10 | 230 | 280 |
| 2 | 3 | 1 | INVESTIGATION RESULT<br>REGARDING△△ | 5 | 5 | 75 | 72 |
| 3 | 4 | 3 | ... | 30 | 40 | 50 | 51 |
| 4 | 5 | 2 | ... | 12 | 20 | 18 | 20 |
| 5 | 2 | 1 | LIST OF AIs<br>STATUS DATE | 0 | 10 | 150 | 250 |
| 6 | 7 | 5 | ... | 20 | 6 | 103 | 108 |
| 7 | 7 | 4 | ... | 100 | 78 | 50 | 120 |
| 8 | 7 | 4 | ... | 55 | 51 | 440 | 45 |
| ... | | | | | | | |

Fig. 5

ELECTRONIC WHITEBOARD SYSTEM, SEARCH RESULT DISPLAY METHOD OF ELECTRONIC WHITEBOARD, AND NON-TRANSITORY COMPUTER READABLE MEDIUM STORING PROGRAM THEREOF

INCORPORATION BY REFERENCE

This application is based upon and claims the benefit of priority from Japanese patent application No. 2015-050692, filed on Mar. 13, 2015, the disclosure of which is incorporated herein in its entirety by reference.

BACKGROUND OF THE INVENTION

1. Technical Field

The present invention relates to an electronic whiteboard system, a search result display method of the electronic whiteboard, and a search result display program of the electronic whiteboard.

2. Background Art

Recently, electronic whiteboards such as electronic blackboards and electronic whiteboard functions of Web conferences have increasingly come into wide use. In an electronic whiteboard, objects such as text, figures, and images can be drawn in a virtual canvas, and they can be shared among a plurality of users. Further, since an area in an electronic whiteboard can be expanded, a number of information items can be arranged in one area. However, when the size of the electronic whiteboard becomes larger and a number of information items (objects) are arranged in one area, it is very difficult to grasp the overall information (objects) and the structure of the electronic whiteboard. In such a case, information (objects) can be easily summarized by dividing the electronic whiteboard into a plurality of areas. In view of this, various methods for dividing an electronic whiteboard into a plurality of areas have been proposed.

On the other hand, a system handling the electronic whiteboards has a function that searches for a desired part in an existing electronic whiteboard. In such a system, a user can specify one or a plurality of conditions from various search conditions including a string, a corresponding object type, a created date and time, a last modified date and time, a creator, a last modified person, an electronic whiteboard name, and tag information to search for the electronic whiteboard. For example, electronic whiteboard(s) can be searched for in order to display a list of Action Items (hereinafter abbreviated as "AIs") that have been determined for each conference held in the past six months from electronic whiteboards registered in the electronic whiteboard system and to confirm or update a status of each "AI".

One conventional method for displaying search results uses a string specified by a user and displays a "title of an electronic whiteboard" and "a part hit in the search+characters before and after the hit" as a search result. Further, various information items associated with the electronic whiteboard such as the "last modified date and time", the "last modified person", and the "electronic whiteboard creator" may be displayed together with the above information. The search result includes a link to the electronic whiteboard, and when the user clicks the link, the user can access the corresponding electronic whiteboard to view or edit the electronic whiteboard.

However, in the case of the above conventional method for displaying the search results, as display contents of the search results are local, when the user views the search result screen, the user cannot directly imagine how a desired electronic whiteboard is drawn on the screen, and the user needs to click the link of the search result and open the electronic whiteboard so that it will be displayed on the screen in order to view or edit surroundings of a corresponding object. When the electronic whiteboard that has been opened and displayed on the screen is not a desired result, it is necessary for the user to repeat an operation to return to the search result screen, click a link of another search result and check as to whether it is a subject electronic whiteboard until the subject electronic whiteboard is displayed. This requires time and effort of the user to obtain the desired result, and thus it is difficult to find the desired electronic whiteboard.

In order to solve such a problem in the conventional method for displaying the search results, "Search result display apparatus, method, and program" disclosed in Japanese Unexamined Patent Application Publication No. 2008-102613 describes a technique that manages electronic whiteboards as pages conceptually, and when a plurality of electronic whiteboards are searched for, the plurality of electronic whiteboards that have been searched for are directly displayed on a search result screen.

As described above, even when the plurality of electronic whiteboards are searched for, the technique disclosed in Japanese Unexamined Patent Application Publication No. 2008-102613 can directly display the plurality of electronic whiteboards that have been searched for on the search result screen.

However, although conventional techniques including the technique disclosed in Japanese Unexamined Patent Application Publication No. 2008-102613 are provided with a technique related to division of an electronic whiteboard into areas, they are not provided with a technique for composing one electronic whiteboard by a plurality of different areas of the electronic whiteboard as the search result screen that displays the search results. Moreover, the conventional techniques including Japanese Unexamined Patent Application Publication No. 2008-102613 are not able to solve the problem in which the electronic whiteboard cannot be edited on the search result screen.

In general, a desired function is that, in regard to the display contents of the search results of the plurality of electronic whiteboards, direct images of the search results are displayed on the electronic whiteboard, information of the search results and information of surroundings of the search results can be viewed on the search result screen, and objects can be edited on the search result screen. It is desirable that direct images of information of a searched part in an original electronic whiteboard which has been searched for including information of surroundings of the searched part are displayed as they are displayed on the electronic whiteboard on the search result screen for displaying the search results. A desired function is that a user can directly view the information related to the searched part and the information related to the surroundings of the searched part on the search result screen, and the user can edit an object of a part where it is necessary to be edited on the search result screen.

SUMMARY

The present invention has been made in view of such circumstances, and an object of the present invention is to provide an electronic whiteboard system that can display search results collectively on one electronic whiteboard, even when an original electronic whiteboard which has been searched for is divided into a plurality of areas and also displays direct images of the search results on a screen, a search result display method of the electronic whiteboard, and a search result display program of the electronic whiteboard. That is, an object of the present invention is to provide an electronic whiteboard system that can display the direct images of the search results on the electronic whiteboard, allow information of the search results and information of surroundings of the search results to be viewed on a search result screen, and also allows an object of a part where it is necessary to be edited on the search result screen, a search result display method of the electronic whiteboard, and a search result display program of the electronic whiteboard.

In order to solve the above-mentioned problem, the electronic whiteboard system, the search result display method of the electronic whiteboard, and the search result display program of the electronic whiteboard mainly incorporate the following characteristic configurations.

(1) An electronic whiteboard system according to the present invention displays a result of searching for one or a plurality of electronic whiteboards based on a search condition specified by a user on the screen. The electronic whiteboard system includes:

search means for dividing an electronic whiteboard into a plurality of areas and searching for the electronic whiteboard based on a search condition specified by a user by each of the divided areas;

extraction means for extracting one or a plurality of the areas that are matched with the search condition or one or a plurality of the areas to which an object that is matched with the search condition belongs as a search result;

creation means for creating a search result electronic whiteboard, the search result electronic whiteboard being composed of one screen information in which each of the extracted areas that are matched with the search condition are arranged in a list; and presenting means for displaying the created search result electronic whiteboard on a screen so that it will be presented to the user who requested the search.

(2) A search result display method of an electronic whiteboard according to the present invention that displays a result in which one or a plurality of electronic whiteboards are searched for based on a search condition on a screen. The search result display method of the electronic whiteboard include steps of:

dividing an electronic whiteboard into a plurality of areas and searching for the electronic whiteboard based on a search condition specified by a user by each of the divided areas;

extracting one or a plurality of the areas that are matched with the search condition or one or a plurality of the areas to which an object that is matched with the search condition belongs as a search result;

creating a search result electronic whiteboard, the search result electronic whiteboard being composed of one screen information in which each of the extracted areas that are matched with the search condition are arranged in a list, and displaying the created search result electronic whiteboard on a screen so that it will be presented to the user who requested the search.

(3) A search result display program of an electronic whiteboard according to the present invention carries out the search result display method of the electronic whiteboard described in the above (2) in a program that can be executed by a computer.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 3 is a table showing an example of electronic whiteboard data held in an SV storage apparatus of a server shown in FIG. 1;

FIG. 4 is a table showing an example of area data held in the SV storage apparatus of the server shown in FIG. 1;

FIG. 5 is a table showing an example of object data held in the SV storage of the server shown in FIG. 1;

EXEMPLARY EMBODIMENT

Figure 1:
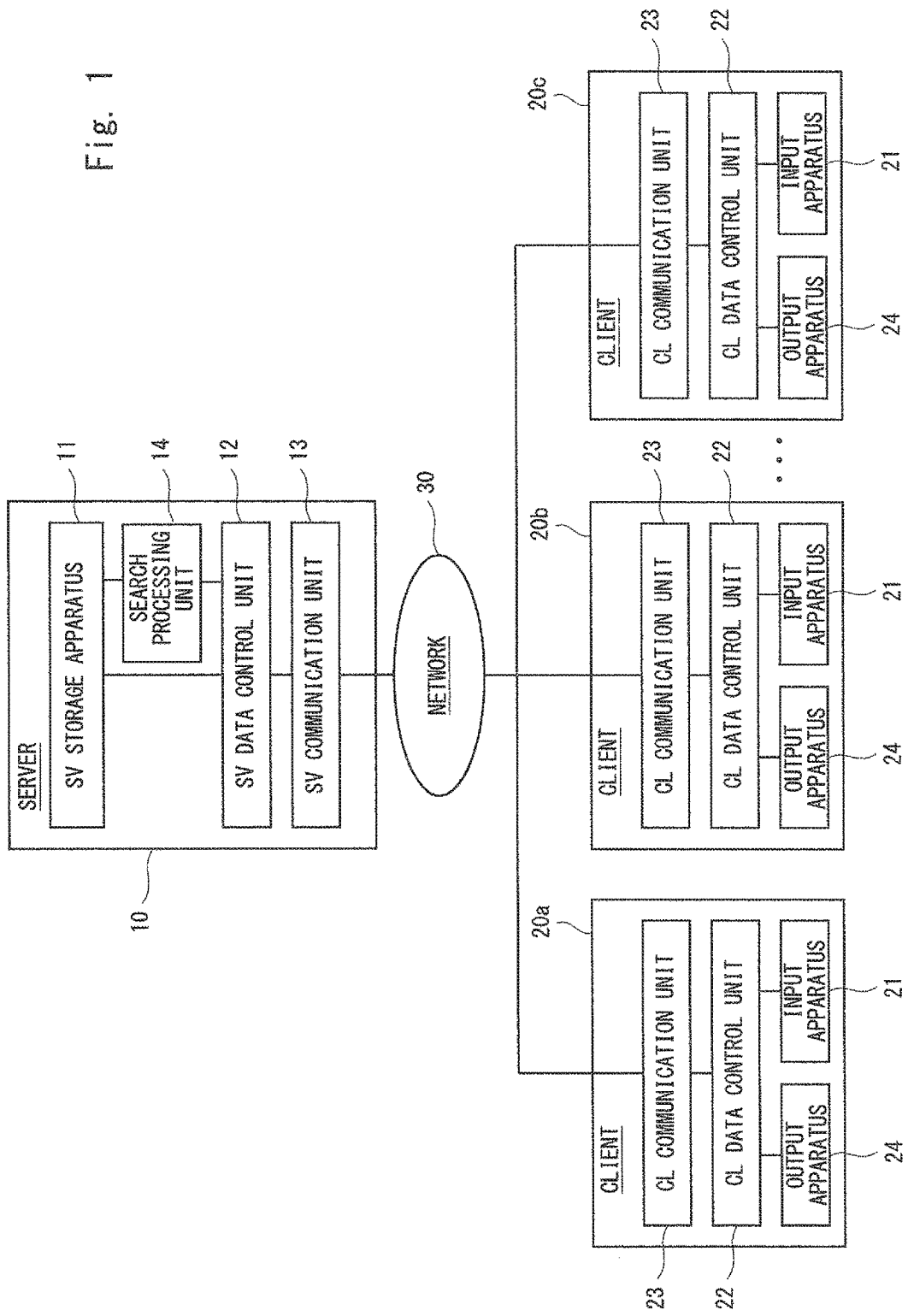
FIG. 1 is a system configuration diagram showing an example of a system configuration according to an embodiment of an electronic whiteboard system of the present invention.

Hereinafter, a preferred embodiment of an electronic whiteboard system, a search result display method of the electronic whiteboard system, and a search result display program of the electronic whiteboard according to the present invention will be explained with reference to the attached drawings. Note that in the following explanation, although the electronic whiteboard system and the search result display method of the electronic whiteboard according to the present invention will be explained, it is obvious that the search result display method of the electronic whiteboard may be carried out as the search result display program of the electronic whiteboard that can be executed by a computer or the search result display program of the electronic whiteboard may be stored in a storage medium that can be read by a computer. Further, it is obvious that the reference numerals added for easier understanding to respective elements in the respective drawings have been provided for convenience sake, and the present invention is not limited to the illustrated aspects.

(Features of the Present Invention)

Prior to giving descriptions of the embodiment of the present invention, an overview of features of the present invention will be explained first. A main feature of the present invention is a search function of a system handling electronic whiteboards, each of which has been divided into a plurality of areas, in which objects are extracted for each area, and an electronic whiteboard composed of areas in which the extracted objects are present is displayed as a search result. Then, a user can view information of a part that is matched with a search condition and information of surroundings of the part in a direct screen image, view a plurality of search results on one screen that has been divided into areas, and edit arbitrary objects on the search result screen. Note that the term "search" in the present invention does not indicate a so-called "search in page" in which a specified string is searched for in an already-opened electronic whiteboard, but instead assumes a case in which one or a plurality of electronic whiteboards are searched, and the electronic whiteboard(s) that is matched with the search condition is collectively displayed on one screen in a manner similar to that in a case in which web pages are searched by an Internet search site or the like.

The features of the present invention will be explained using a specific example. For example, the electronic whiteboard(s) can be searched for in order to display a list of Action Items (hereinafter abbreviated as "AIs") that have been determined for each conference held in the past six months from electronic whiteboards registered in the electronic whiteboard system and to confirm or update a status of each "AI".

A desired function is that, in regard to display contents of the search results, direct images of the search results are displayed on the electronic whiteboard, information that is matched with the search condition including information of surroundings of the matched information can be viewed on a search result screen, and objects can be edited on the search result screen. There may be a request, for example, to edit contents of the electronic whiteboard in order to update the above-mentioned status of each "AI" that has been determined for each conference.

In such a case, when the electronic whiteboard is divided for each conference, and each "AI" has been written as conference minutes, the contents to be edited are present in the plurality of electronic whiteboards. In the search results, when the "AIs" are present in the respective electronic whiteboards, it is troublesome to sequentially open the respective electronic whiteboards and edit corresponding parts in the plurality of electronic whiteboards. Therefore, it is particularly effective in terms of work efficiency if a function that enables direct edit of the search results on the search result screen is included, instead of having to open each of the plurality of electronic whiteboards to edit the corresponding parts.

Figure 7:
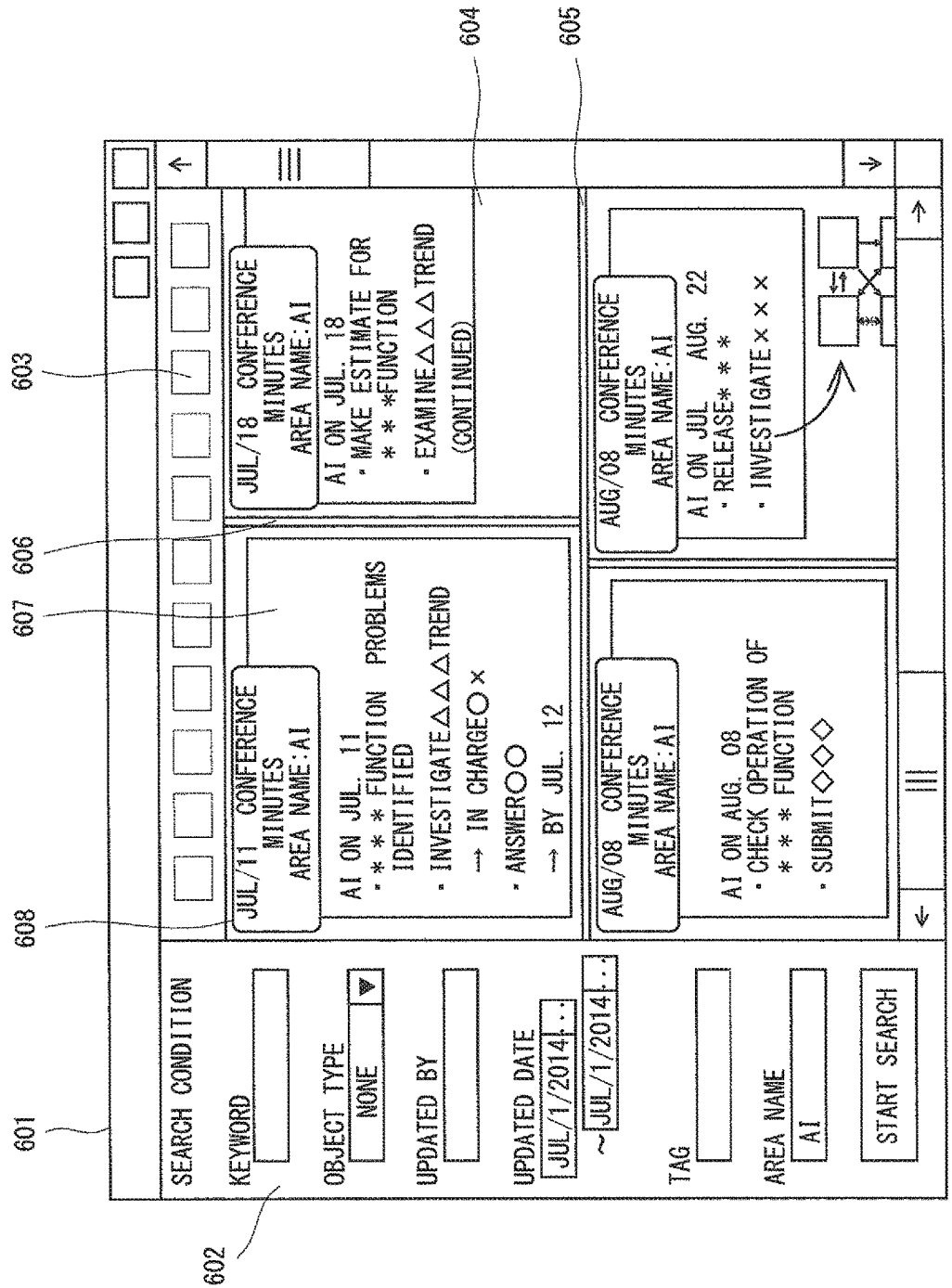
FIG. 7 is a schematic diagram of an example of a screen that enables direct edit of search results on a search result screen that displays the search results of the electronic whiteboard.

An example of the present invention that enables the direct edit of the search results on the search result screen will be explained by referring to FIG. 7. FIG. 7 is a schematic diagram showing an example of a screen that enables the direct edit of the search results on the search result screen that displays the search results of the electronic whiteboard. FIG. 7 shows an example, using the above example of the electronic whiteboards related to the conference minute, in which results of a search using a search condition that a term "AI" is included in the area name are displayed on a screen as a search result electronic whiteboard. The search has been performed with search conditions in which a period to be searched is set for the past six months and a term "AI" is included in the area name.

Note that in FIG. 7, a reference numeral 601 indicates an application window, and a reference numeral 602 indicates a GUI (Graphical User Interface) that allows a user to specify a search condition. A reference numeral 603 indicates a toolbar that provides various functions used by an application to view and edit an electronic whiteboard, and a reference numeral 604 indicates an area divided for each electronic whiteboard. Reference numerals 605 and 606 indicate border lines of the divided areas, and a reference numeral 607 indicate an object inside the area. A reference numeral 608 indicates complementary information when the search result is displayed and, in the example of FIG. 7, displays created dates of original electronic whiteboards which are: "Jul. 11", "Jul. 18", "Aug. 8", and "Aug. 22", an electronic whiteboard name which is: "Conference minutes", and a area name which is: "AI".

As shown in FIG. 7, on the search result screen that is displayed on a screen as a search result electronic whiteboard, direct images of corresponding parts in all electronic whiteboards including the term "AI" in the area name in the past six months which is a period to be searched are distributed in the respective areas and displayed in a list. This facilitates confirmation of a desired search result, and a plurality of electronic whiteboards can be edited on one search result screen, thereby eliminating the need of screen transition in which a new edit screen is opened for each electronic whiteboard.

That is, in regard to the display contents of the search results shown in FIG. 7, a function that displays the direct images of the search results on the electronic whiteboard, enables the direct edit of information of the search results including information of the surroundings of the search results on the search result screen, and enables edit of objects on the search result screen is achieved. That is, the present invention enables the direct edit of the electronic whiteboard(s) on the search result screen as a display method for the search result screen that displays the search results in a system that provides electronic whiteboards, each of which can be divided into a plurality of areas, and thus the present invention solves the problem of the conventional techniques.

Features of a system configuration of the electronic whiteboard according to the present invention will be explained in more detail below. The electronic whiteboard system according to the present invention is configured to include a server that stores electronic whiteboard data and object data and performs data communication with a client used by a user and the client that displays and edits the electronic whiteboard data and the object data and performs data communication with the server.

The server can be connected to a plurality of the clients and has a function that allows the plurality of clients to simultaneously operate the same electronic whiteboard and divides each of one or a plurality of registered electronic whiteboards into a plurality of areas. In addition, the server has a function that receives a search condition from the client(s) and searches for an area(s) that matches the search condition specified by the client(s) from the registered electronic whiteboards, a function that provides the client which has requested the search with one electronic whiteboard composed of one or a plurality of areas including information that matches the search condition from results of the search (the electronic whiteboard shall be hereinafter referred to as a "search result electronic whiteboard"), and a function that reflects edited contents of an object(s) on the search result electronic whiteboard of the client in the corresponding original area and the electronic whiteboard to which the original area belongs.

On the other hand, the client has a function that accepts an input of the search condition from the user on the displayed search screen and requests the server to search for the electronic whiteboard(s), a function that displays the search result electronic whiteboard provided by the server, and a function that allows the user to edit the object(s) in the area present in the search result electronic whiteboard.

As described above, in the present invention, areas that have been obtained by dividing the electronic whiteboard are a unit of the search result, so that the electronic whiteboard composed of the areas that match the search condition is displayed as the search result electronic whiteboard indicating the search results. Then, as the search results are displayed on the electronic whiteboard, a plurality of search results can be directly displayed on one search result screen, and the areas that are present in a plurality of electronic whiteboards can be edited in one search result screen.

(Configuration Example of Embodiment)

Next, an example of a system configuration in the embodiment of the electronic whiteboard system according to the present invention will be explained by referring to FIG. 1. FIG. 1 is a system configuration diagram showing the example of the system configuration of the embodiment of the electronic whiteboard system according to the present invention. The electronic whiteboard system shown in FIG. 1 is configured in such a way that a server 10 and a plurality of clients 20a, 20b, . . . , and 20c (hereinafter collectively referred to as a client 20) are connected via a network 30.

The server (SV) 10 at least includes an SV storage apparatus 11, an SV data control unit 12, an SV communication unit 13, and a search processing unit 14, while the client (CL) 20 at least includes an input apparatus 21, a CL data control unit 22, a CL communication unit 23, and an output apparatus 24.

Firstly, each element in the server 10 will be explained. The SV storage apparatus 11 is a database or a file system that stores various information items related to the electronic whiteboard, such as properties, areas, and object data of electronic whiteboards.

For example, various data items related to the electronic whiteboard, for example, as shown in a table of FIG. 3 are held in the SV storage apparatus 11 as data related to the properties of the electronic whiteboard (hereinafter referred to as "electronic whiteboard data"). FIG. 3 is a table showing an example of the electronic whiteboard data held in the SV storage apparatus 11 of the server 10 shown in FIG. 1. In the example shown in the table of FIG. 3, electronic whiteboard data 100 is composed of various data such as a whiteboard ID 101 that is an identifier of the electronic whiteboard, a whiteboard name 102, created date and time 103, last modified date and time 104, a creator 105, a last modified person 106, . . . and the like.

Moreover, various data, for example, as shown in a table of FIG. 4 is held as data related to an area of the electronic whiteboard (hereinafter referred to as "area data"). FIG. 4 is a table showing an example of the area data held in the SV storage apparatus 11 of the server 10 shown in FIG. 1. In the example shown in the table of FIG. 4, area data 110 is composed of various data such as an area ID 111 that is an identifier of the area, a subject whiteboard ID 112 indicating an identifier of the electronic whiteboard to which the area belongs, an area name 113, an X coordinate 114 and a Y coordinate 115 each indicating a coordinate at a central or upper left position of the area, a width 116 and a height 117 indicating a size of the area, . . . and the like.

Moreover, various data, for example, as shown in a table of FIG. 5 is held as data related to an object created in each area (hereinafter referred to as "object data"). FIG. 5 is a table showing an example of the object data held in the SV storage apparatus 11 of the server 10 shown in FIG. 1. In the example shown in the table of FIG. 5, object data 120 is composed of various data such as an object ID 121 that is an identifier of an object, a subject area ID 122 indicating an identifier of an area to which the object belongs, an object type 123, data 124 indicating object contents, an X coordinate 125 and a Y coordinate 126 each indicating a coordinate at a central or upper left position of the object, a width 127 and a height 128 indicating a size of the object, . . . and the like.

Next, the SV data control unit 12 receives information related to electronic whiteboard operations (various operations such as data acquisition request, creation, deletion, and edit of the electronic whiteboard, creation, deletion, edit of the object, creation, deletion, and edit of the area, and change of a title and a property of the electronic whiteboard) that has been sent from the client 20 and stores the information in the SV storage apparatus 11.

In regard to the edit of the electronic whiteboard, when there is another client 20 which is referring to the same electronic whiteboard, the other client 20 is notified of information of the operations performed by the client 20 in order to reflect a result of the operations in a terminal screen of the other client 20. Further, the SV data control unit 12 receives a request for a search of an electronic whiteboard by a specified condition from the client 20, requests the search processing unit 14 to perform a search by the specified condition, and notifies the client 20 which has requested the search of search results returned from the search processing unit 14.

Next, the search processing unit 14 searches for the electronic whiteboard data, the area data, and the object data in the SV storage apparatus 11 based on the search condition requested by the SV data control unit 12, extracts the area including the information that matches the search condition, and edit each of the extracted areas in a form of the electronic whiteboard to thereby generate a search result electronic whiteboard and return it to the SV data control unit 12.

Next, the SV communication unit 13 receives the data sent from the client 20 and hands it over to the SV data control unit 12. The SV communication unit sends the data received from the SV data control unit 12 to the client 20.

Next, each element in the client 20 will be explained. The input apparatus 21 is an input device such as a mouse, a keyboard, a touch sensor or the like that is operated by a user. The CL data control unit 22 hands over the information related to the electronic whiteboard operations input from the input apparatus 21 to the CL communication unit 23 and controls the CL communication unit 23 to send it to the server 10. Further, the CL data control unit 22 receives, from the CL communication unit 23, the data that is received from the server 10 and draws it on the output apparatus 24 so that the data received from the server 10 is displayed on the output apparatus 24. Furthermore, when the user inputs the search condition and makes a request for a search, the CL data control unit 22 hands over the search condition to the CL communication unit 23 and controls the CL communication unit 23 to send it to the server 10.

The CL communication unit 23 receives the data sent from the server 10 and hands it over to the CL data control unit 22. Further, the CL communication unit 23 sends the data received from the CL data control unit 22 to the server 10. The output apparatus 24 is a display device that displays contents of the electronic whiteboard.

(Explanation of Operation of Embodiment)

Figure 2:
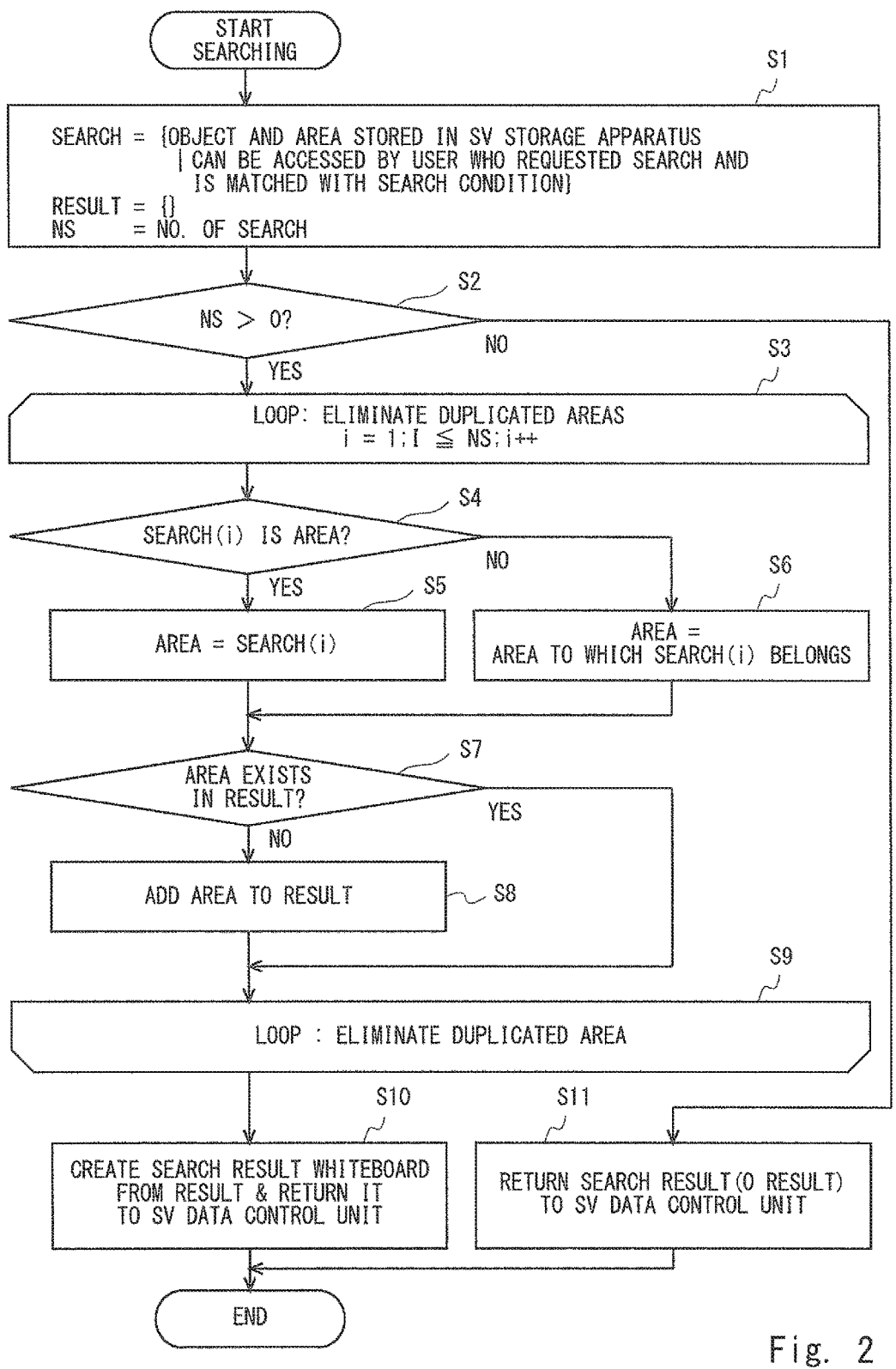
FIG. 2 is a flowchart for explaining an example of an operation of the electronic whiteboard system shown in FIG. 1.

Next, an operation of the electronic whiteboard system shown in FIG. 1 will be explained in detail by referring to a flowchart of FIG. 2 using an example in which a search result of the electronic whiteboard is displayed as a "search result electronic whiteboard". FIG. 2 is a flowchart for explaining an example of the operation of the electronic whiteboard system shown in FIG. 1 and shows an example of an operation in which search results of the electronic whiteboard(s) are displayed as a "search result electronic whiteboard". That is, FIG. 2 illustrates an example of a search operation performed by the search processing unit 14 of the server 10 based on the search condition specified by the client 20.

The search processing unit 14 searches the SV storage apparatus 11 for the objects and area data that can be accessed by the client which is a user who has requested the search and is also matched with the search condition specified by the user. Note that in the flowchart of FIG. 2, the search result is expressed as "SEARCH", the number of search results is expressed as "NS", and an area storage region that temporarily stores an area which should be set in the search result electronic whiteboard that displays the search results of the electronic whiteboard is expressed as "RESULT".

When the process of the flowchart shown in FIG. 2 is started, the search processing unit 14 firstly searches information related to objects and areas stored in the SV storage apparatus 11 for information that can be accessed by the client 20 of the user who has requested the search and is also matched with the search condition specified by the user, sets the searched information in the search results "SEARCH", initializes the area storage region "RESULT" that temporarily stores the area that should be set in the search result electronic whiteboard, and defines the number of search results that are matched with the specified search condition as the number "NS" of the search results "SEARCH" (step S1).

Next, it is checked as to whether or not the number "NS" of the search results "SEARCH" is greater than "0", i.e., it is checked as to whether or not the objects and areas that are matched with the specified search condition have been detected (step S2). When the number "NS" of the search results "SEARCH" is "0" (NO in the step S2), i.e., when the objects and areas that are matched with the search condition have not been detected, the process moves to the step S11, information indicating that the number "NS" of the search results that have matched with the search condition is zero is returned to the SV data control unit 12 as the search result "SEARCH" (step S11), and the operation of the search processing unit 14 is ended.

On the other hand, when the number "NS" of the search results "SEARCH" is greater than "0" (YES in the step S2), i.e., when there is at least one or more objects and areas that are matched with the specified search condition, the process moves to the step S3, in which loop processing is performed, that sequentially sets the areas that are matched with the search condition and the area to which the objects that are matched with the search condition belong in the area storage region "RESULT". Firstly, the loop processing using a repeat variable i is set (step S3) in order to repeat processing of the respective steps (steps S4 to S8) until the step S9 in which the areas that are matched with the search condition are sequentially set while performing processing to eliminate duplicated areas so that a plurality of the same areas will not be included in the areas of the search results "SEARCH" which will be arranged on the search result electronic whiteboard. The repeat variable i is an integer within a range of 1≤i≤NS and SEARCH (i) indicates an ith search result "SEARCH".

When the loop processing that eliminates the duplication in the steps S4 to S8 is set, it is checked as to whether or not the ith search result "SEARCH (i)" is an area (step S4). When the ith search result "SEARCH" (i) is an area (YES in the step S4), the ith search result "SEARCH (i)" is set as it is to a work area "AREA" that sets the area which will be stored in the area storage region "RESULT" (step S5).

On the other hand, when the ith search result "SEARCH (i)" is not an area but an object (NO in the step S4), the area to which the object of the ith search result "SEARCH (i)" belongs is looked for, and the area to which the object of the ith search result "SEARCH (i)" belongs is set in the work area "AREA" (step S6).

After that, it is checked as to whether or not the area related to the ith search result "SEARCH (i)" that has been set in the work area "AREA" is already present in the area storage region "RESULT" (step S7). When the area related to the ith search result "SEARCH (i)" that has been set in the work area "AREA" is still not present in the area storage region "RESULT" (NO in the step S7), it is evaluated that the area related to the ith search result "SEARCH (i)" that has been set in the work area "AREA" is a new area which should be added to and arranged on the search result electronic whiteboard, and the area related to the ith search result "SEARCH (i)" that has been set in the work area "AREA" is added to the area storage region "RESULT" (the step S8). After that, the process moves to the step S9.

On the other hand, when the area related to the ith search result "SEARCH (i)" that has been set in the work area "AREA" is already present in the area storage region "RESULT" (YES in the step S7), the processing of the step S8 is skipped in order to avoid duplicated arrangement of the same area on the search result electronic whiteboard, and the process moves to the step S9.

Further, in the step S9, it is checked as to whether or not the repeat variable i has reached the number "NS" of the search results, and when the repeat variable i has not reached the number "NS" of the search results, in order to perform the processing for the next search result "SEARCH (i)", the repeat variable i is updated, and the processing of the steps S4 to S8 is repeated (step S9).

In the step S9, when it is evaluated that the repeat variable i has reached the number "NS" of the search results, the processing related to all the search results "SEARCH" is ended, and all the areas related to the search results "SEARCH" which should be arranged on the search result electronic whiteboard are stored in the area storage region "RESULT" without any duplication of the same area. Therefore, the process moves to the step S10, the search result electronic whiteboard on which the areas stored in the area storage region "RESULT" are arranged in a list is created, information related to the created search result electronic whiteboard is returned to the SV control unit 12 (step S10), and the operation of the search processing unit 14 is ended.

When the information returned from the search processing unit 14 is the information indicating that the number "NS" of the search results is zero, the SV control unit 12 notifies the client 20 which has requested the search that the electronic whiteboard including the information that are matched the specified search condition does not exist. On the other hand, when the information returned from the search processing unit 14 is the information related to the search result electronic whiteboard, the SV control unit 12 sends the information related to the search result electronic whiteboard to the client 20.

Note that in the step S10, in regard to a method performed by the search processing unit 14 for arranging the areas that are stored in the area storage region "RESULT" in a list and creating the search result electronic whiteboard, the areas may be vertically or horizontally aligned as appropriate. Alternatively, the following method of arranging the areas may also be used. As shown in, for example, FIG. 7, the areas may be sorted in order of the created date and time, grouped into months, and arranged by each row or column. In a further alternative, the areas may be grouped into creators and arranged by each row or column, or the areas may be grouped using a range of search scores, and the areas may be arranged by each row or column.

In a still further alternative, the areas may be grouped using properties specific to the system such as degrees of utilization of the electronic whiteboards, hierarchies of repositories in which the electronic whiteboards are stored, and browsing history of the user who requested the search, and the areas may be arranged by each row or column. Further alternatively, a plurality of the above-mentioned methods may be combined to arrange the areas, or the areas may be arranged by an arrangement method specified by the client 20 from the above-mentioned arrangement methods.

Figure 6:
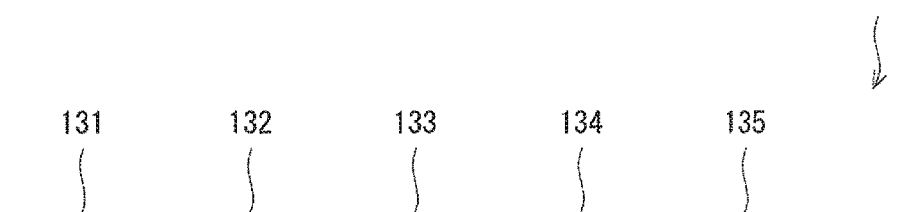
FIG. 6 is a table showing an example of an arrangement information table held in the SV storage apparatus of the server shown in FIG. 1.

The SV data control unit 12 holds arrangement information of the areas to be arranged on the search result electronic whiteboard that displays the search results of the electronic whiteboards in the SV storage apparatus 11 as, for example, an arrangement table shown in FIG. 6. FIG. 6 is a table showing an example of the arrangement information table held in the SV storage apparatus 11 of the server 10 shown in FIG. 1 and shows an example of a table in which the arrangement information of the respective areas of the search result electronic whiteboard is registered. An arrangement information table 130 shown in the table of FIG. 6 is composed of various data including at least an area ID 131 indicating an area arranged on the electronic whiteboard, an X coordinate 132 and a Y coordinate 133 each indicating a coordinate at a central or upper left position of the area, and a width 134 and a height 135 indicating a size of the area.

As shown in the arrangement information table 130 of FIG. 6, when the area ID, the position, and the size of each area which will be arranged on the search result electronic whiteboard are held in the table, the following matters will be possible. That is, on the search result screen of the client 20 that displays the search result electronic whiteboard, when the user of the client 20 edits the search result electronic whiteboard, information indicating on which area an operation has been performed and what operation has been performed on which object is sent to the SV control unit 12 of the server 10 from the client 20. This enables the SV control unit 12 to easily refer to the arrangement information table 130 that is set in the SV storage apparatus 11, update the information of the original electronic whiteboard, and save it again. When there is another client 20 that shares the information of the electronic whiteboard with the client 20, the SV control unit 12 can notify the other client 20 of the information of the edit on the shared electronic whiteboard.

Note that in the step S10 of the flowchart shown in FIG. 2, when the search processing unit 14 attempts to create the search result electronic whiteboard in which the areas stored in the area storage region "RESULT" are arranged in a list, and the size of the area which will be arranged is extremely large, there may be a problem in which viewability of the search result electronic whiteboard deteriorates.

To solve this problem, an importance of the area having a size larger than a predetermined size threshold among the areas stored in the area storage region "RESULT" may be evaluated, and when the importance is lower than a predetermined importance threshold, the entire area may be reduced to a predetermined size, and then the area may be arranged on the search result electronic whiteboard. It is then possible to avoid a state in which a large part of the search result electronic whiteboard is occupied by a large area having less important information, thereby preventing the viewability of the search result screen on which the search result electronic whiteboard is displayed from deteriorating.

Alternatively, as another reference for evaluating the importance of the areas stored in the area storage region "RESULT", for example, any one of following information items processed by the electronic whiteboard system may be used. The information items processed by the electronic whiteboard system includes, for example, whether or not a search score of the corresponding area is lower than an average of search scores of other areas, whether or not a degree of utilization of an original electronic whiteboard to which the corresponding area belongs is lower than an average of degrees of utilization of the original electronic whiteboards to which the other areas belong, whether or not a specific tag (e.g., a tag that differentiates the importance of the corresponding area from those of other areas such as an important tag) that has been previously set in the corresponding area or an object inside the corresponding area is present, whether or not a user of a client who requested the search is a creator of the corresponding area or the original electronic whiteboard to which the corresponding area belongs, whether or not an object created or edited by the user of the client who requested the search is present in the corresponding area, and whether or not a frequency in which the user of the client who requested the search accessed the original electronic whiteboard to which the corresponding area belongs is lower than an average of frequencies of access to the original electronic whiteboards to which the other areas belong may be used.

(Explanation of Advantages of Embodiment)

As described above in detail, this embodiment can provide the following advantages.

Firstly, since the search results are displayed for the respective areas as the search result electronic whiteboard on the search result screen of the client 20 used by the user, even when the original electronic whiteboard to be searched for is divided into a plurality of areas, the areas of the corresponding parts of the respective electronic whiteboards can be extracted and displayed in a list, and thus the user can check the direct images of the corresponding parts and easily obtain a target search result.

Secondly, as the search results are collectively displayed in a list on one electronic whiteboard (i.e., the search result electronic whiteboard) to be displayed on the screen, a plurality of search results can be simultaneously displayed.

Thirdly, as described above, as the respective search results are displayed for the respective areas collectively on one electronic whiteboard (i.e., the search result electronic whiteboard), the corresponding area of the search result electronic whiteboard can be edited in the same manner as in the case when a normal electronic whiteboard is edited. Further, as a structure of object arrangement other than the corresponding area will not be changed, a result of the edit can be easily reflected in the original electronic whiteboard to which the corresponding area belongs.

Fourthly, as the areas of the search results are grouped into meaningful groups (e.g., in order of the created date and time, by different creators, in order of the search score etc.), and the areas can be arranged by each row or column on one electronic whiteboard (i.e., the search result electronic whiteboard) or as the areas can be arranged on one electronic whiteboard (i.e., the search result electronic whiteboard) using the arrangement method specified by a user, the user can easily obtain a target search result.

Fifthly, as information can be edited in a plurality of original electronic whiteboards on one screen that displays the search result electronic whiteboard, it is not necessary to open the plurality of original electronic whiteboards one-by-one in order to edit them, and thus it is easy to edit the information.

The configuration of the preferred embodiment of the present invention has been explained above. However, it should be noted that the embodiment is merely an illustration of the present invention and does not limit the present invention in any way. It is obvious for those who are skilled in the art that various modifications can be made according to a specific use without departing from the scope of the invention.

According to the electronic whiteboard system, the search result display method of the electronic whiteboard, and the search result display program of the electronic whiteboard of the present invention, following advantages can be produced.

Firstly, as the search results are displayed for respective areas as the search result electronic whiteboard on the search result screen of the client used by a user, even when the original electronic whiteboard to be searched for is divided into a plurality of areas, the areas of the corresponding parts of the respective electronic whiteboards can be extracted and displayed in a list, and thus the user can check the direct images of the corresponding parts and easily obtains a target search result.

Secondly, as the search results are collectively displayed in a list on one electronic whiteboard (i.e., the search result electronic whiteboard) to be displayed on the screen, a plurality of search results can be simultaneously displayed.

Thirdly, as described above, as the respective search results are displayed for the respective areas collectively on one electronic whiteboard (i.e., the search result electronic whiteboard), the corresponding area of the search result electronic whiteboard can be edited in the same manner as the case when a normal electronic whiteboard is edited. Further, as a structure of object arrangement other than the corresponding area will not be changed, a result of the edit can be easily reflected in the original electronic whiteboard to which the corresponding area belongs.

Further, it is obvious that the present invention is not limited to the above embodiment and various modifications can be made without departing from the above-described scope of the present invention. For example, although it has been explained in the above embodiment that the present invention is a hardware configuration, the present invention is not limited to this. The present invention can be realized by causing a CPU (Central Processing Unit) to execute a computer program that performs an arbitrary process.

In the above example, the program can be stored and provided to a computer using any type of non-transitory computer readable media.

Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The whole or part of the embodiments disclosed above can be described as, but not limited to, the following supplementary notes.

(Supplementary Note 1)

An electronic whiteboard system comprising:
    a search unit configured to divide an electronic whiteboard into a plurality of areas and searches for the electronic whiteboard based on a search condition specified by a user by each of the divided areas;
    an extraction unit configured to extract one or a plurality of the areas that are matched with the search condition or one or a plurality of the areas to which an object that is matched with the search condition belongs as a search result;
    a creation unit configured to create a search result electronic whiteboard, the search result electronic whiteboard being composed of one screen information in which each of the extracted areas that are matched with the search condition are arranged in a list; and
    a presenting unit configured to display the created search result electronic whiteboard on a screen so that it will be presented to the user who requested the search, wherein
    the electronic whiteboard system displays a result in which one or a plurality of electronic whiteboards are searched for based on the search condition on the screen.

(Supplementary Note 2)

The electronic whiteboard system according to Supplementary note 1, wherein
    when the respective areas extracted as the search results are displayed in the list and arranged on the search result electronic whiteboard,
        the respective areas extracted as the search results are arranged in a first arrangement order in which the areas are vertically or horizontally aligned,
        the respective areas extracted as the search results are arranged in a second arrangement order in which the areas are sorted in order of created date and time, grouped into months, and arranged by each row or column,
        the respective areas extracted as the search results are arranged in a third arrangement order in which the areas are grouped into creators and arranged by each row or column,
        the respective areas extracted as the search results are arranged in a fourth arrangement order in which the areas are grouped using a range of search scores and arranged by each row or column,
        the respective areas extracted as the search results are arranged in a fifth arrangement order in which the areas are grouped using any one of a degree of utilization of the original electronic whiteboard which is searched for, a hierarchy of a repository that stores the electronic whiteboard, or browsing history of the user who requests the search, and the areas are arranged by each row or column,
        the respective areas extracted as the search results are arranged in a sixth arrangement order using any one or a plurality of the first to fifth arrangement orders, or
        the respective areas extracted as the search results are arranged in a seventh arrangement order in which an arrangement method specified by the user who has requested the search is used.

(Supplementary Note 3)
The electronic whiteboard system according to Supplementary note 1, wherein
when there is an area having a size larger than a predetermined size threshold among the areas extracted as the search results, an importance of the corresponding area is evaluated, and when the importance of the corresponding area is lower than a predetermined importance threshold, the entire corresponding area is reduced to a predetermined size, and the corresponding area is arranged on the search result electronic whiteboard.

(Supplementary Note 4)
The electronic whiteboard system according to Supplementary note 3, wherein
the importance of the area extracted as the search result is evaluated using, in place of the importance threshold for evaluating the importance of the area extracted as the search result,
whether or not a search score of the corresponding area, the importance of the corresponding area being evaluated, is lower than an average of search scores of other areas,
whether or not a degree of utilization of the original electronic whiteboard to which the corresponding area belongs, the importance of the corresponding area being evaluated, is lower than an average of degrees of utilization of the original electronic whiteboards to which the other areas belong,
whether or not a frequency of access to the original electronic whiteboard to which the corresponding area belongs, the importance of the corresponding area being evaluated, is lower than an average of frequencies of access to the original electronic whiteboards to which the other areas belong,
whether or not a predetermined specific tag is present in the corresponding area or an object inside the corresponding area, the importance of the corresponding area being evaluated,
whether or not the user who requested the search is a creator of the corresponding area or the original electronic whiteboard to which the corresponding area belongs, the importance of the corresponding area being evaluated, or
whether or not the object created or edited by the user who requested the search is present in the corresponding area, the importance of the corresponding area being evaluated.

(Supplementary Note 5)
The electronic whiteboard system according to Supplementary note 1, wherein
when the search result electronic whiteboard that is displayed on the screen is edited by the user, based on the area that is edited among the respective areas of the search result electronic whiteboard and a result of the editing in the area, information of the corresponding area of the original electronic whiteboard which is searched is updated and saved again.

(Supplementary Note 6)
The electronic whiteboard system according to Supplementary note 1, wherein
when there is another user who shares information of the electronic whiteboard, and when the area corresponding to the area that belongs to the electronic whiteboard shared by the other user among the respective areas in the search result electronic whiteboard that is displayed on the screen is edited by the user, the other user who shares the information of the electronic whiteboard is notified of information indicating the edit on the shared electronic whiteboard.

(Supplementary note 7)
A search result display method of an electronic whiteboard comprising steps of:
dividing an electronic whiteboard into a plurality of areas and searching for the electronic whiteboard based on a search condition specified by a user by each of the divided areas;
extracting one or a plurality of the areas that are matched with the search condition or one or a plurality of the areas to which an object that is matched the search condition belongs as a search result;
creating a search result electronic whiteboard, the search result electronic whiteboard being composed of one screen information in which each of the extracted areas that are matched with the search condition are arranged in a list;
displaying the created search result electronic whiteboard on a screen so that it will be presented to the user who requested the search; and
displaying a result in which one or a plurality of electronic whiteboards are searched for based on the search condition on the screen.

(Supplementary Note 8)
The search result display method according to Supplementary note 7, wherein
when the respective areas extracted as the search results are displayed in the list and arranged on the search result electronic whiteboard,
the respective areas extracted as the search results are arranged in a first arrangement order in which the areas are vertically or horizontally aligned,
the respective areas extracted as the search results are arranged in a second arrangement order in which the areas are sorted in order of created date and time, grouped into months, and arranged by each row or column,
the respective areas extracted as the search results are arranged in a third arrangement order in which the areas are grouped into creators and arranged by each row or column,
the respective areas extracted as the search results are arranged in a fourth arrangement order in which the areas are grouped using a range of search scores and arranged by each row or column,
the respective areas extracted as the search results are arranged in a fifth arrangement order in which the areas are grouped using any one of a degree of utilization of the original electronic whiteboard which is searched for, a hierarchy of a repository that stores the electronic whiteboard, or browsing history of the user who requests the search, and the areas are arranged by each row or column,
the respective areas extracted as the search results are arranged in a sixth arrangement order using any one or a plurality of the first to fifth arrangement orders, or
the respective areas extracted as the search results are arranged in a seventh arrangement order in which an arrangement method specified by the user who has requested the search is used.

(Supplementary Note 9)
The search result display method according to Supplementary note 7, wherein
when there is an area having a size larger than a predetermined size threshold among the areas extracted as the search results, an importance of the corresponding area is evaluated, and when the importance of the corresponding area is lower than a predetermined importance threshold, the entire corresponding area is reduced to a predetermined size, and the corresponding area is arranged on the search result electronic whiteboard.

(Supplementary Note 10)
A non-transitory computer readable medium storing a search result display program of an electronic whiteboard for causing a computer to execute the search result display method of the electronic whiteboard according to Supplementary note 7.

While the invention has been particularly shown and described with reference to embodiments thereof, the invention is not limited to these embodiments. It will be understood by those of ordinary skill in the art that various changes in form and details may be made therein without departing from the spirit and scope of the present invention as defined by the claims.

What is claimed is:

1. An electronic whiteboard system comprising:
a memory storing instructions; and
a hardware processor configured to execute the instructions to:
divide an electronic whiteboard into a plurality of areas and search for the electronic whiteboard based on a search condition specified by a user by each of the divided areas,
extract one or a plurality of the areas that are matched with the search condition or one or a plurality of the areas to which an object that is matched with the search condition belongs as a search result,
create a search result electronic whiteboard, the search result electronic whiteboard being composed of one screen information in which each of the extracted areas that are matched with the search condition are arranged in a list, and
display the created search result electronic whiteboard on a screen so that it will be presented to the user who requested the search, wherein
the electronic whiteboard system displays a result in which one or a plurality of electronic whiteboards are searched for based on the search condition on the screen, and
when the respective areas extracted as the search results are displayed in the list and arranged on the search result electronic whiteboard,
the respective areas extracted as the search results are arranged in a first arrangement order in which the areas are vertically or horizontally aligned,
the respective areas extracted as the search results are arranged in a second arrangement order in which the areas are sorted in order of created date and time, grouped into months, and arranged by each row or column,
the respective areas extracted as the search results are arranged in a third arrangement order in which the areas are grouped into creators and arranged by each row or column,
the respective areas extracted as the search results are arranged in a fourth arrangement order in which the areas are grouped using a range of search scores and arranged by each row or column,
the respective areas extracted as the search results are arranged in a fifth arrangement order in which the areas are grouped using any one of a degree of utilization of the original electronic whiteboard which is searched for, a hierarchy of a repository that stores the electronic whiteboard, or browsing history of the user who requests the search, and the areas are arranged by each row or column,
the respective areas extracted as the search results are arranged in a sixth arrangement order using any one or a plurality of the first to fifth as arrangement orders, or
the respective areas extracted as the search results are arranged in a seventh arrangement order in which an arrangement method specified by the user who has requested the search is used.

2. The electronic whiteboard system according to claim 1, wherein
when there is an area having a size larger than a predetermined size threshold among the areas extracted as the search results, an importance of the corresponding area is evaluated, and when the importance of the corresponding area is lower than a predetermined importance threshold, the entire corresponding area is reduced to a predetermined size, and the corresponding area is arranged on the search result electronic whiteboard.

3. The electronic whiteboard system according to claim 2, wherein
the importance of the area extracted as the search result is evaluated using, in place of the importance threshold for evaluating the importance of the area extracted as the search result,
whether or not a search score of the corresponding area, the importance of the corresponding area being evaluated, is lower than an average of search scores of other areas,
whether or not a degree of utilization of the original electronic whiteboard to which the corresponding area belongs, the importance of the corresponding area being evaluated, is lower than an average of degrees of utilization of the original electronic whiteboards to which the other areas belong,
whether or not a frequency of access to the original electronic whiteboard to which the corresponding area belongs, the importance of the corresponding area being evaluated, is lower than an average of frequencies of access to the original electronic whiteboards to which the other areas belong,
whether or not a predetermined specific tag is present in the corresponding area or an object inside the corresponding area, the importance of the corresponding area being evaluated,
whether or not the user who requested the search is a creator of the corresponding area or the original electronic whiteboard to which the corresponding area belongs, the importance of the corresponding area being evaluated, or
whether or not the object created or edited by the user who requested the search is present in the corresponding area, the importance of the corresponding area being evaluated.

4. The electronic whiteboard system according to claim 1, wherein when the search result electronic whiteboard that is displayed on the screen is edited by the user, based on the area that is edited among the respective areas of the search result electronic whiteboard and a result of the editing in the area, information of the corresponding area of the original electronic whiteboard which is searched is updated and saved again.

5. The electronic whiteboard system according to claim 1, wherein when there is another user who shares information of the electronic whiteboard, and when the area corresponding to the area that belongs to the electronic whiteboard shared by the other user among the respective areas in the search result electronic whiteboard that is displayed on the screen is edited by the user, the other user who shares the information of the electronic whiteboard is notified of information indicating the edit on the shared electronic whiteboard.

6. A search result display method of an electronic whiteboard comprising:

dividing an electronic whiteboard into a plurality of areas and searching for the electronic whiteboard based on a search condition specified by a user by each of the divided areas;

extracting one or a plurality of the areas that are matched with the search condition or one or a plurality of the areas to which an object that is matched the search condition belongs as a search result;

creating a search result electronic whiteboard, the search result electronic whiteboard being composed of one screen information in which each of the extracted areas that are matched with the search condition are arranged in a list;

displaying the created search result electronic whiteboard on a screen so that it will be presented to the user who requested the search; and displaying a result in which one or a plurality of electronic whiteboards are searched for based on the search condition on the screen, wherein when the respective areas extracted as the search results are displayed in the list and arranged on the search result electronic whiteboard, the respective areas extracted as the search results are arranged in a first arrangement order in which the areas are vertically or horizontally aligned, the respective areas extracted as the search results are arranged in a second arrangement order in which the areas are sorted in order of created date and time, grouped into months, and arranged by each row or column, the respective areas extracted as the search results are arranged in a third arrangement order in which the areas are grouped into creators and arranged by each row or column, the respective areas extracted as the search results are arranged in a fourth arrangement order in which the areas are grouped using a range of search scores and arranged by each row or column, the respective areas extracted as the search results are arranged in a fifth arrangement order in which the areas are grouped using any one of a degree of utilization of the original electronic whiteboard which is searched for, a hierarchy of a repository that stores the electronic whiteboard, or browsing history of the user who requests the search, and the areas are arranged by each row or column, the respective areas extracted as the search results are arranged in a sixth arrangement order using any one or a plurality of the first to fifth arrangement orders, or the respective areas extracted as the search results are arranged in a seventh arrangement order in which an arrangement method specified by the user who has requested the search is used.

7. The search result display method according to claim 6, wherein when there is an area having a size larger than a predetermined size threshold among the areas extracted as the search results, an importance of the corresponding area is evaluated, and when the importance of the corresponding area is lower than a predetermined importance threshold, the entire corresponding area is reduced to a predetermined size, and the corresponding area is arranged on the search result electronic whiteboard.

8. A non-transitory computer readable medium storing a search result display program of an electronic whiteboard for causing a computer to execute a search result display method comprising:

dividing an electronic whiteboard into a plurality of areas and searching for the electronic whiteboard based on a search condition specified by a user by each of the divided areas;

extracting one or a plurality of the areas that are matched with the search condition or one or a plurality of the areas to which an object that is matched the search condition belongs as a search result;

creating a search result electronic whiteboard, the search result electronic whiteboard being composed of one screen information in which each of the extracted areas that are matched with the search condition are arranged in a list;

displaying the created search result electronic whiteboard on a screen so that it will be presented to the user who requested the search; and displaying a result in which one or a plurality of electronic whiteboards are searched for based on the search condition on the screen, wherein when the respective areas extracted as the search results are displayed in the list and arranged on the search result electronic whiteboard, the respective areas extracted as the search results are arranged in a first arrangement order in which the areas are vertically or horizontally aligned, the respective areas extracted as the search results are arranged in a second arrangement order in which the areas are vertically or horizontally aligned, the respective areas extracted as the search results are arranged in a third arrangement order in which the areas are grouped into creators and arranged by each row or column, the respective areas extracted as the search results are arranged in a fourth arrangement order in which the areas are grouped using a range of search scores and arranged by each row or column, the respective areas extracted as the search results are arranged in a fifth arrangement order in which the areas are grouped using any one of a degree of utilization of the original electronic whiteboard which is searched for, a hierarchy of a repository that stores the electronic whiteboard, or browsing history of the user who requests the search, and the areas are arranged by each row or column, the respective areas extracted as the search results are arranged in a sixth arrangement order using any one or a plurality of the first to fifth arrangement orders, or the respective areas extracted as the search results are arranged in a seventh arrangement order in which an arrangement method specified by the user who has requested the search is used.

9. The electronic whiteboard system according to claim 1, wherein the search result electronic whiteboard is edited by the user directly on the screen displaying the search result.

10. The non-transitory computer readable medium according to claim 8, when there is an area having a size larger than a predetermined size threshold among the areas extracted as the search results, an importance of the corresponding area is evaluated, and when the importance of the corresponding area is lower than a predetermined importance threshold, the entire corresponding area is reduced to a predetermined size, and the corresponding area is arranged on the search result electronic whiteboard.

* * * * *